(12) United States Patent
Bonhaus et al.

(10) Patent No.: US 7,492,957 B1
(45) Date of Patent: Feb. 17, 2009

(54) USING RUN LENGTH ENCODING TO DETECT TARGET IMAGES

(75) Inventors: Daryl Bonhaus, Williamsburg, VA (US); Carey Nachenberg, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 633 days.

(21) Appl. No.: 11/215,631

(22) Filed: Aug. 29, 2005

(51) Int. Cl.
*G06K 9/36* (2006.01)
*G06K 9/46* (2006.01)
*H04B 1/66* (2006.01)
*H04N 7/12* (2006.01)

(52) U.S. Cl. .................... 382/245; 375/240; 348/384.1; 358/426.01

(58) Field of Classification Search ......... 382/162–180, 382/218–220, 232–253; 375/240–240.23; 348/384.1–396.1; 358/426.01–426.16
See application file for complete search history.

(56) References Cited

U.S. PATENT DOCUMENTS

| | | | | |
|---|---|---|---|---|
| 3,942,154 A | * | 3/1976 | Akami et al. | 382/111 |
| 4,490,850 A | * | 12/1984 | Nally et al. | 382/196 |
| 5,303,313 A | * | 4/1994 | Mark et al. | 382/235 |
| 5,590,224 A | * | 12/1996 | Fast et al. | 382/291 |
| 5,729,635 A | * | 3/1998 | Fast et al. | 382/254 |
| 5,802,361 A | * | 9/1998 | Wang et al. | 382/217 |
| 5,889,885 A | * | 3/1999 | Moed et al. | 382/172 |
| 6,748,110 B1 | * | 6/2004 | Wallack | 382/173 |
| 6,954,215 B2 | * | 10/2005 | Noyle | 345/592 |

OTHER PUBLICATIONS

"Gold Parser, A Free Multi-Platform Parser Generator", [online] devincook.com [retrieved Oct. 7, 2003] Retrieved from the Internet: <URL: http://www.devincook.com/goldparser/index.htm.>.
"RFC 2821—Simple Mail Transport Protocol", Klensin J., editor, Apr. 2001, [online] Faqs.org [retrieved Oct. 13, 2003] Retrieved from the Internet: <URL: http://www.faqs.org/rfcs/rfc2821.html>.
Pop-Up Stopper Professional [Online] Apr. 22, 2005, [Retrieved from the Internet on Apr. 22, 2005] Retrieved from the Internet: <URL: http://www.panicware.com/index.html>, Seattle, WA.

(Continued)

*Primary Examiner*—Matthew C Bella
*Assistant Examiner*—Manav Seth
(74) *Attorney, Agent, or Firm*—Fenwick & West LLP

(57) ABSTRACT

An image detection manager uses run length encoding to detect a target image in a candidate image. The image detection manager extracts run length encoding data from the candidate image. The image detection manager distinguishes between a foreground and background of the candidate image and target image, and takes into account an interval of scale factors for matching color runs in the foreground and length runs in the background. The image detection manager treats background pixels as wildcards, and utilizes fuzzy color matching in which color levels of adjacent pixels in the foreground are allowed a specified variation. Using such functionality, the image detection manager compares rows of the run length encoding data from the candidate image to rows of run length encoding data from the target image, and determines whether the target image is present in the candidate image.

19 Claims, 4 Drawing Sheets

OTHER PUBLICATIONS

AdsCleaner v 4.3 for Windows NT/2000/XP, [Online] Apr. 22, 2005 [Retrieved from the Internet on Apr. 22, 2005] Retrieved from the Internet: <URL: http://www.adscleaner.com>.

AntiTracer: Unwanted Pop-ups and other Advertisements, [Online] Apr. 22, 2005, [Retrieved from the Internet on Apr. 22, 2005] Retrieved from the Internet: <URL: http://www.antitracer.com/popup_killer.html>, Dublin, IE.

Sabin, Todd, "Comparing binaries with graph isomorphisms", downloaded from http://www.bindview.com/Services/Razor/Papers/2004/comparing_binaries.cfm, Jan. 17, 2006, Cupertino, CA.

Flake, Halvar, "Automated Reverse Engineering" Black Hat Windows 2004, downloaded from http://www.blackhat.com/html/bh-media-archives/bh-archives-2004.html, Jan. 17, 2006, Seattle, WA.

* cited by examiner

US 7,492,957 B1

USING RUN LENGTH ENCODING TO DETECT TARGET IMAGES

TECHNICAL FIELD

This invention pertains generally to computer image identification, and more specifically to using run length encoding to detect target images.

BACKGROUND

Those who attempt to deceive electronic consumers with fraudulent e-mail messages and web sites often embed the logo of a legitimate company in the fraudulent e-mail or web page in an attempt to add credibility. Current fraud detection methods can track Uniform Resource Locators (URLs) that have been determined to point to fraudulent sites, but these methods can be made more accurate and more proactive if the fraudulent use of a legitimate logo used by the perpetrator can be identified. If, for example, an e-mail message contains the logo of an e-commerce or financial institution, and also contains URLs that point to web sites that do not belong to or are not sanctioned by the relevant institution, not only can the e-mail message be classified as fraudulent, but the URLs it contains can be added to a blacklist of URLs known to be used for fraud.

However, it can be extremely difficult to distinguish fraudulent image content from legitimate image content. Known image identification techniques such as hashing or various transform-based methods are easily defeated by slight modifications to the image, such as manipulation of the color levels of individual pixels or embedding the logo in a larger image. Such modifications typically cannot be detected visually by the end user. Thus, logo images can be used fraudulently by making minor modifications which are sufficient enough to spoof traditional image detection methods, but minor enough to go undetected by the naked eye.

What is need are methods, systems and computer readable media for robustly detecting images even when they have been subjected to these and other evasive techniques.

DISCLOSURE OF INVENTION

Computer-implemented methods, computer systems and computer-readable media use run length encoding to detect a target image in a candidate image. An image detection manager extracts run length encoding data from the candidate image. The image detection manager distinguishes between a foreground and background of the candidate image and target image, and takes into account an interval of scale factors for matching color runs in the foreground and length runs in the background. The image detection manager treats background pixels as wildcards, and utilizes fuzzy color matching in which color levels of adjacent pixels in the foreground are allowed a specified variation. Using such functionality, the image detection manager compares rows of the run length encoding data from the candidate image to rows of run length encoding data from the target image, and determines whether the target image is present in the candidate image.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
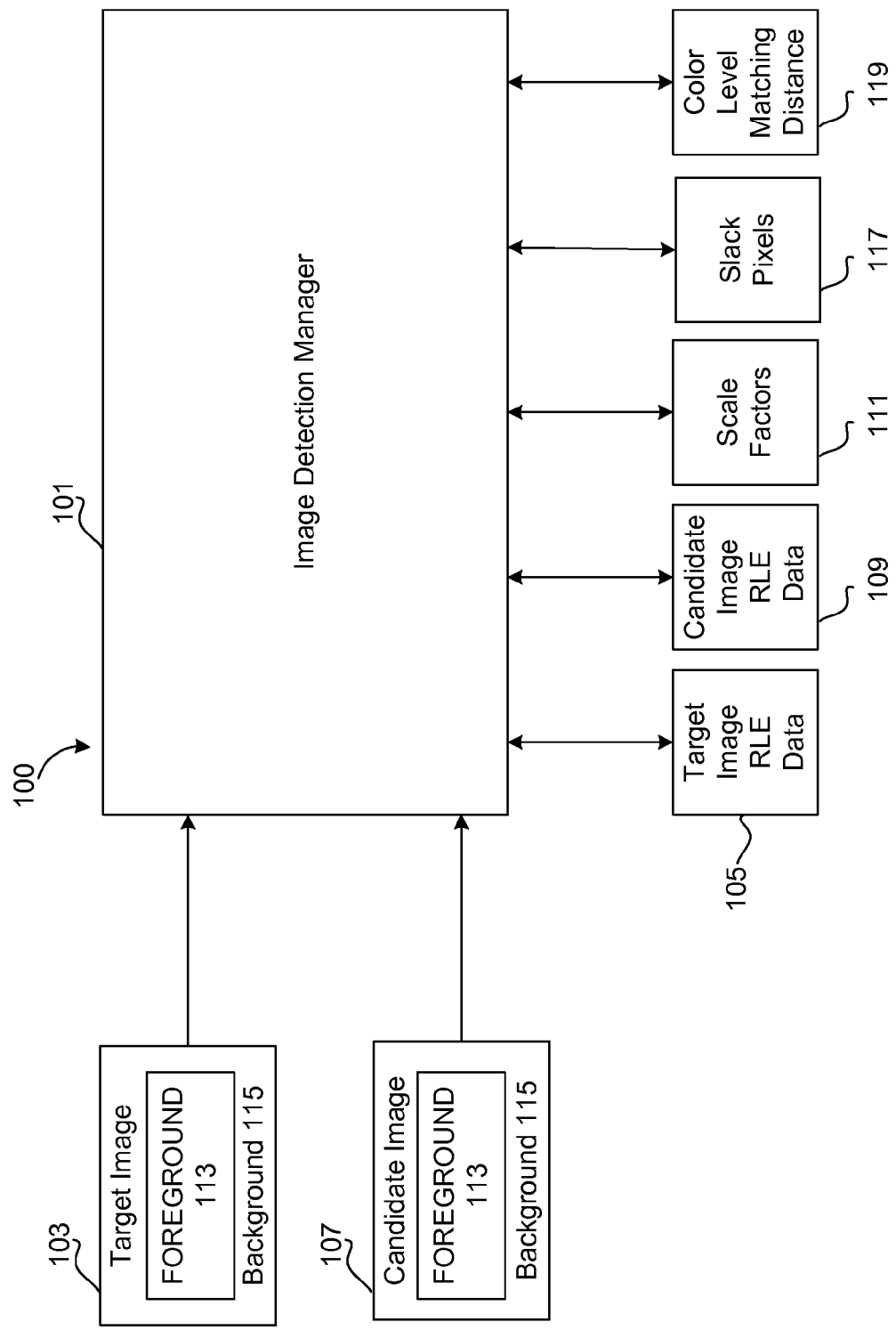
FIG. 1 is a block diagram, illustrating a high level overview of a system for using run length encoding to detect target logo images, according to some embodiments of the present invention.

FIG. 1 illustrates a high level overview of a system 100 for practicing some embodiments of the present invention. An image detection manager 101 uses run length encoding to detect target logo images 103. It is to be understood that although the image detection manager 101 is illustrated as a single entity, as the term is used herein an image detection manager 101 refers to a collection of functionalities which can be implemented as software, hardware, firmware or any combination of these. Where an image detection manager 101 is implemented as software, it can be implemented as a standalone program, but can also be implemented in other ways, for example as part of a larger program, as a plurality of separate programs, as one or more device drivers or as one or more statically or dynamically linked libraries.

It is further to be understood that the image detection manager 101 can be instantiated on and/or as part of a server, client, firewall, intrusion detection system, proxy, gateway, switch and/or any combination of these and/or other computing devices and/or platforms. Furthermore, an image detection manager 101 can be implemented as or as a component of a software security suite, plug-in and/or any application that detects target images 103.

As illustrated in FIG. 1, the image detection manager 101 uses run-length encoding (RLE) to detect target logo images 103. RLE, a compression technique in which consecutive occurrences of a data value in a data stream are replaced with a single instance of the data value and a count, is known to those of ordinary skill in the relevant art. The image detection manager 101 can extract target RLE information 105 from each row of a target logo image 103 in a training phase, so as to have RLE data 105 describing a target image 103 which the image detection manager 101 attempts to detect (e.g., a logo of a trusted financial institution or e-commerce site). In other embodiments, the target RLE data 105 can be supplied or retrieved by the image detection manager 101 from another source (not illustrated), such as a database of target image RLE data 105. The implementation mechanics of extracting RLE data 105 from an image are known to those of ordinary skill in the relevant art, and the application thereof within the context of the present invention will be readily apparent to those so skilled in light of this specification. It is to be understood that the target image 103 is described herein as a logo image, but that in other embodiments the image detection manager 101 can utilize the methodologies described and illustrated herein to detect other types of images as desired.

As illustrated, the image detection manager 101 attempts to find a target logo image 103 in a candidate image 107 (e.g., an image included in a suspicious e-mail message or web page). The image detection manager 101 extracts candidate RLE information 109 row by row from the candidate image 107, and compares this information 109 with the target RLE data 105 obtained from the target image 103.

Because an instance of a logo in the candidate image 107 can be scaled up or down from the original target image 103, the image detection manager 101 maintains a range of scale factors 111 for matching color runs in the target image 103 foreground 113. The interval of scale factors 111 allows matching even after round-off/truncation in the candidate image 107 resulting from the scaling process. The range of scale factors 111 further allows for scale factor 111 calculation absent an initial certainty as to the scaling ratio between the target image 103 and the candidate image 107. The image detection manager 101 can match color on the first run of the target RLE data 105, and set the initial scale interval 111 accordingly. The scale interval 111 is then narrowed as more of the target 105 is matched.

During the matching process, the image detection manager 101 treats background regions 115 in the logo image 103 as "wild cards," so that only the (scaled) length of the background run 115 is important, and the color of the background 115 is ignored. More specifically, when attempting to match a background run 115, the image detection manager 101 computes a range of lengths corresponding to the range of scale factors 111. The image detection manager skips a number of pixels corresponding to the lower bound of this range, and considers the background run 115 tentatively matched. The image detection manager 101 then attempts to match the remainder of the row recursively. If the recursive match fails, the image detection manager 101 skips more pixels corresponding to subsequent lengths in the range, and attempts further recursive matches. The image detection manager continues this process until it gets a match, or until the upper bound (optionally including slack pixels 117, described below) is exceeded, at which point the row is considered not to be a match. This allows the image detection manager 101 to detect a target image 103 the foreground 113 of which has been superimposed on a varied background 115.

In some embodiments, background pixels 115 are those that are not opaque, whereas foreground pixels 113 are those that are. As is known by those of ordinary skill in the relevant art, the opaque status of a pixel is determined by the value of the alpha channel.

In some embodiments, short pixel runs (e.g., one or two pixels in length) in the target logo image 103 are treated as background pixels 115, so as to account for interpolated regions or anti-aliasing. The specific length that is considered a short run is a variable design parameter. In some embodiments, leading and trailing background pixels 115 are not included in the target RLE data 105 at all.

Additionally, image interpolation can cause modification of the color of pixels at the ends of color runs. At a given scale factor 111, foreground color runs 113 may be a few pixels shorter than indicated by the scale factor 111, in which case background runs 115 would typically be correspondingly longer to include the modified pixels. For this reason, in some embodiments a number of slack pixels 117 are specified to enable the image detection manager 101 to match images in the presence of interpolated pixels. When matching a foreground run 113 in the target image 103, the scaled run length in the image is permitted to be shorter than the lower bound that the scale factor 111 would indicate by the number of slack pixels 117. Correspondingly, when matching a background run 115 in the target image 103, the high pixel count is permitted to be longer than the upper bound that the scale interval 111 would indicate by the same number of slack pixels 117 (Hence the term slack pixels 117; any slack in the foreground 113 is taken up by the intervening background areas 115). The specific number of slack pixels 117 to utilize is a variable design parameter.

In some embodiments, when extracting target RLE data 105 corresponding to color runs in the target image 103, a zero-length background run 115 is inserted between adjacent foreground runs 113. The slack-pixel 117 functionality then allows matching when the logo is scaled and an intervening interpolated pixel is introduced.

Those of ordinary skill in the relevant art know that strict RLE sequences are formed by collecting adjacent pixels of identical color. However, in some embodiments of the present invention the image detection manager 101 utilizes fuzzy color matching in which color levels of adjacent pixels are allowed to differ by a prescribed amount. This allows matching in regions where lossy image compression has been used (e.g., JPEG images) and overcomes a certain degree of obfuscation without the need for preprocessing either the target logo image 103 or the candidate image 107. Fuzzy color matching also allows handling of target logos images 103 with gradients and some salting, without the need for preprocessing.

More specifically, to allow fuzzy matching, the image detection manager 101 employs a color level matching distance 119. Adjacent pixels whose color components are within the specified distance 119 are included in a single RLE sequence. RLE sequences whose center colors are within the specified distance are considered a match. The specific color level matching distance 119 to use is a variable design parameter.

Figure 2:
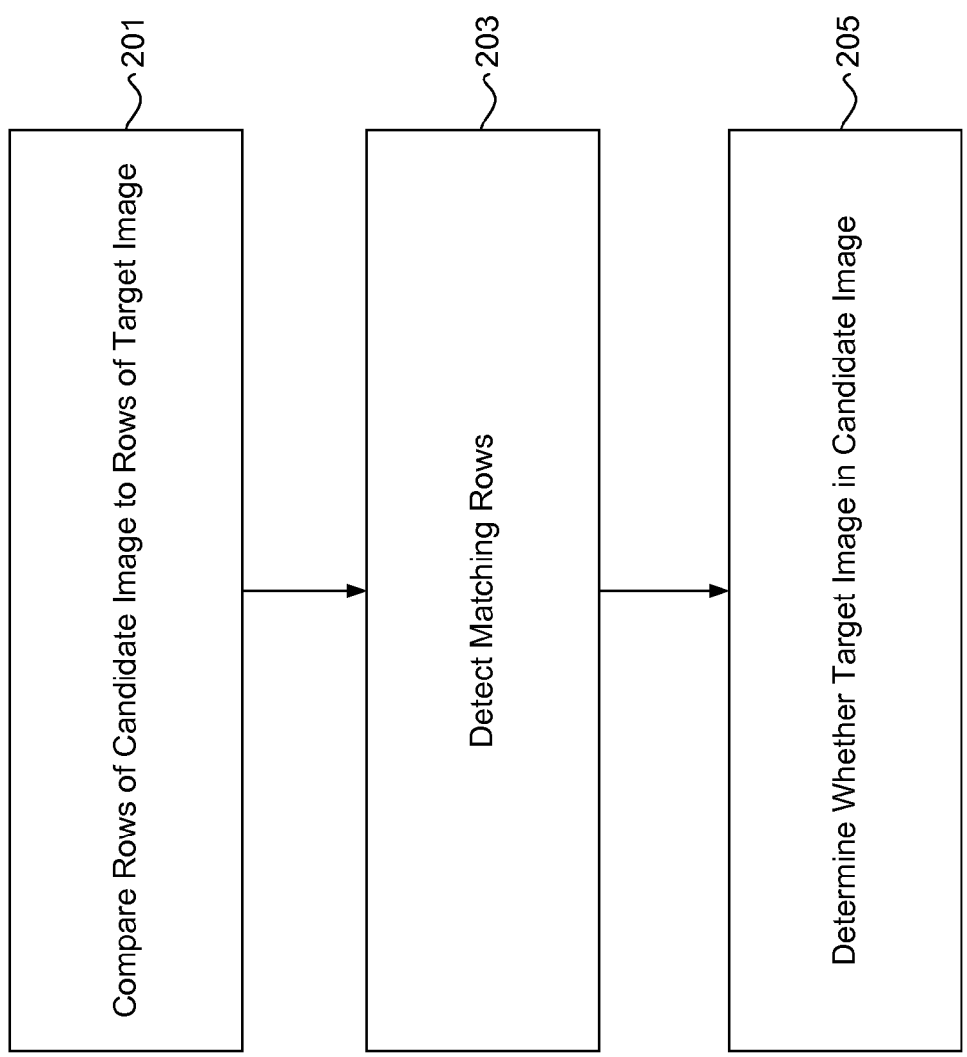
FIG. 2 is a flowchart, illustrating steps for determining whether the target image is present in the candidate image, according to various embodiments of the present invention.

FIG. 2 is a flowchart, illustrating steps for determining whether the target image 103 is present in the candidate image 107, according to various embodiments of the present invention. Using the various functionalities described above in conjunction with FIG. 1, the image detection manager 101 compares 201 rows of the run length encoding data 109 from the candidate image 107 to rows of the run length encoding data 105 from the target image 103. The image detection manager 101 detects 203 matching rows in the two data sets, and determines 205 whether the target image 103 is present in the candidate image 107 based thereon.

Generally, it is to be understood that the level of correspondence between target and candidate rows required for a match varies between embodiments. More specifically, in some embodiments, the image detection manager 101 counts only an exact match between correlating target and candidate rows as a match. In other embodiments, the image detection manager 101 counts a match of just a requisite percentage of a row in the target image 103 to corresponding content in a row of the candidate image 107 as a match of that row. What value to use as the requisite percentage is a variable design parameter.

Furthermore, in some embodiments, the image detection manager 101 counts only a match of a row in the target image 103 to a match of corresponding content beginning at a corresponding location in a corresponding row in the candidate image 107 as a match of that row. In other embodiments, the image detection manager 101 counts a match of a row in the target image 103 to a match of corresponding content beginning at any point in a corresponding row in the candidate image 107 as a match of that row.

Additionally, in some embodiments, the image detection manager 101 only determines 205 that the target image 103 is present in the candidate image 107 when all rows of the target image 103 are found therein (in one embodiment in corresponding positions, in another, in any position). In other embodiments, the image detection manager 101 only requires that a (variable design parameter) requisite percentage of the rows of the target image 103 be found in the candidate image 107 (again, in one embodiment in corresponding positions, in another, in any position) to determine 205 that the target image 103 is present therein.

Figure 3:
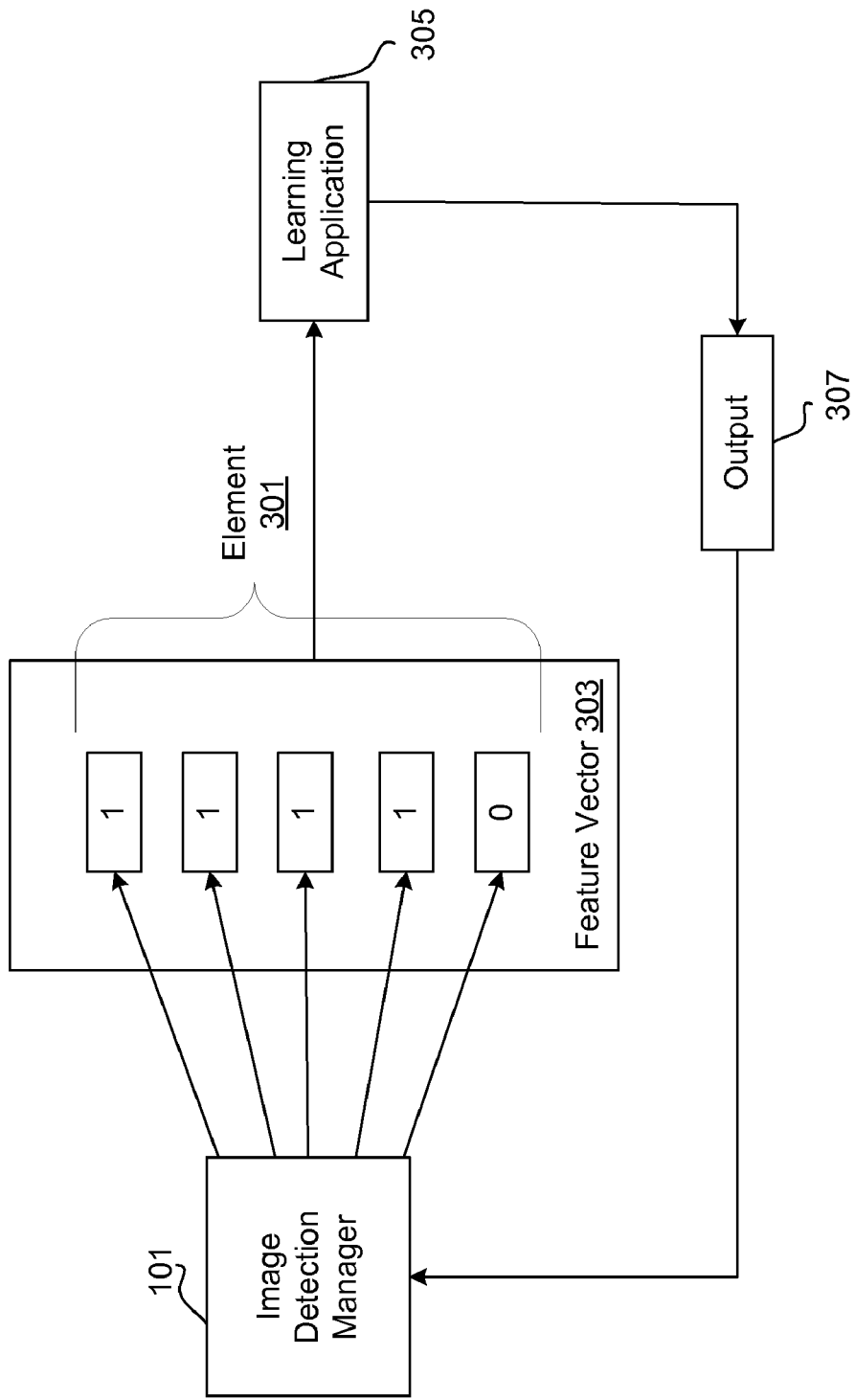
FIG. 3 is a block diagram, illustrating employing post-processing functionality to help determine whether the target image is present in the candidate image, according to one embodiment of the present invention.

Turning now to FIG. 3, in one embodiment of the present invention, the image detection manager 101 employs post-processing functionality to supplement the functionality described in conjunction with FIG. 2 in determining whether the target image 103 is present in the candidate image 107. In such an embodiment, the image detection manager 101 populates elements 301 of a feature vector 303 in which each element 301 pertains to a row in the target image 103, such that each element 301 is set to a value which indicates whether the corresponding row in the candidate image 107 is a match. The image detection manager 101 supplies the populated feature vector 303 as input to a machine learning application 305 that has been trained to detect image matches based on a suitable data set of matching and non-matching feature vectors 303. The image detection manager 101 then bases the determination of whether the target image 103 is present in the candidate image 107 at least in part on resulting output 307 of the machine learning application 305.

More specifically, each row in the target logo image is paired with an element 301 of the feature vector 303. Each line that is matched in the candidate image results in a specific entry (e.g., "1") in the corresponding element 301 of the feature vector 303. The feature vector 303 is then supplied to the machine learning application 305 (e.g., a naive-Bayes classifier or a neural network) that has been trained on a suitable data set.

Figure 4:
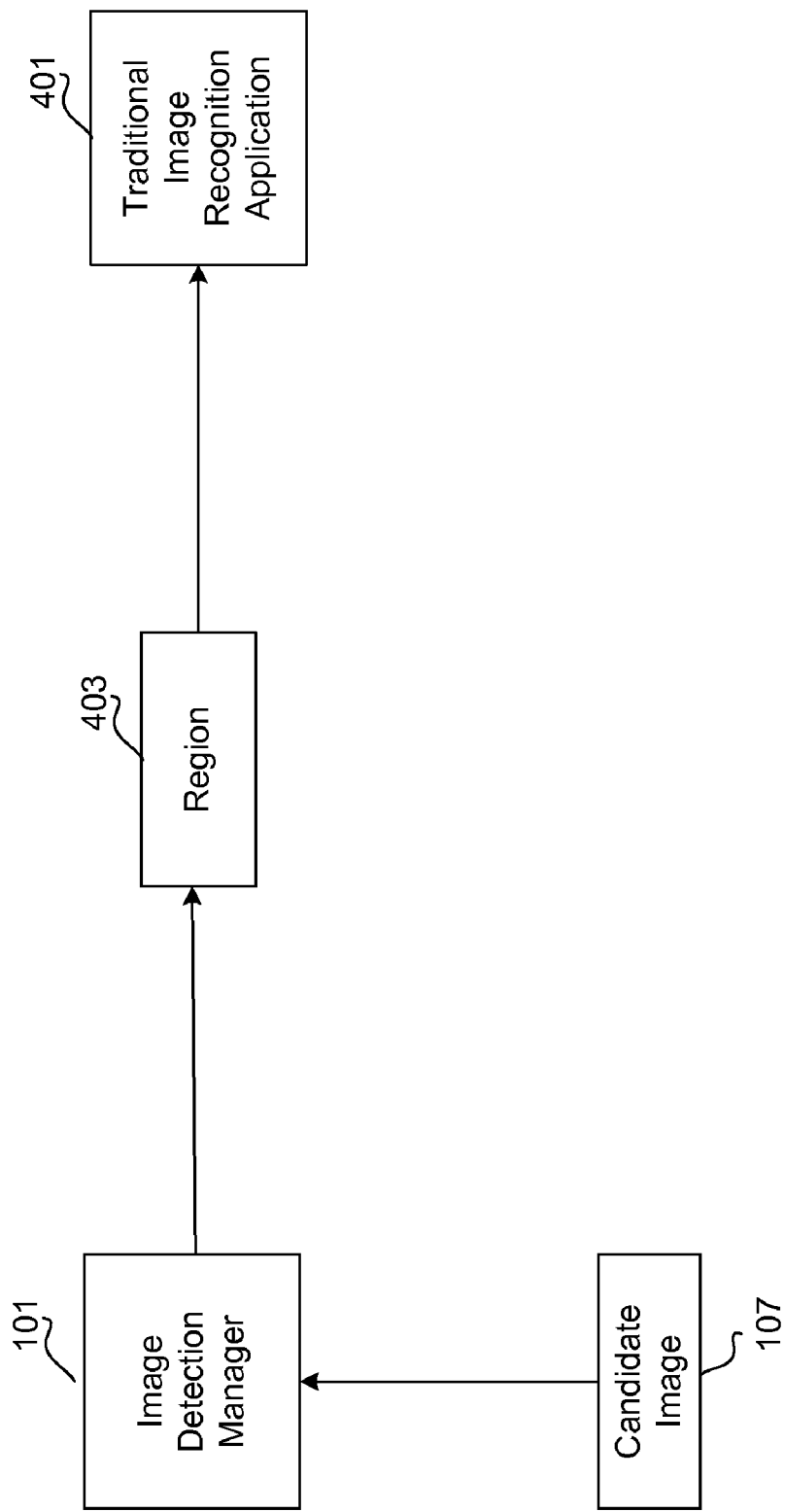
FIG. 4 is a block diagram, illustrating employing post-processing functionality to help determine whether the target image is present in the candidate image, according to another embodiment of the present invention.

As illustrated in FIG. 4, in some embodiments the image detection manager 101 couples the RLE detection scheme described above in conjunction with FIGS. 1 and 2 with a traditional image-matching application 401, thereby further increasing accuracy and reducing false positives. In this scenario, a match on any of the lines of the target logo image 103 determines the region 403 of the candidate image 107 that may contain the logo. This region 403 can be isolated and supplied to a traditional image recognition application 401, based on, for example, wavelet or Fourier transforms to help confirm the match. As is known by those of ordinary skill in the relevant art, wavelet transform matching is very effective for scaled images, but is not well-suited to detecting images that have been embedded in other images.

As will be understood by those familiar with the art, the invention may be embodied in other specific forms without departing from the spirit or essential characteristics thereof. Likewise, the particular naming and division of the modules, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Embodiments of the present invention can comprise executable computer program code stored on a computer-readable storage medium. Accordingly, the disclosure of the present invention is intended to be illustrative, but not limiting, of the scope of the invention, which is set forth in the following claims.

What is claimed is:

1. A computer implemented method for using run length encoding to detect a target image in a candidate image, the method comprising the steps of:
   using a computer to perform the steps comprising:
   extracting run length encoding data from the candidate image;
   distinguishing between a foreground and background of the candidate image and target image;
   matching color runs in the foreground and length runs in the background, the matching comprising:
      setting an initial scale interval according to a ratio of pixels in the target image matched to the candidate image for a first foreground match in a row; and
      narrowing the scale interval as more of the target image foreground is matched to the candidate image foreground in that row;
   treating background pixels as wildcards;
   utilizing fuzzy color matching in which color levels of adjacent pixels in the foreground are allowed a specified variation;
   comparing rows of the run length encoding data from the candidate image to rows of run length encoding data from the target image; and
   determining whether the target image is present in the candidate image based on at least results of the comparing step.

2. The method of claim 1 wherein distinguishing between the foreground and background of the candidate image and target image further comprises:
   treating pixels values that are not opaque as background; and
   treating pixel values that are opaque as foreground.

3. The method of claim 2 further comprising:
   treating short foreground runs in the target image as background.

4. The method of claim 2 further comprising:
   discarding leading and trailing background pixels in the target image.

5. The method of claim 1 further comprising:
   counting as a match at least one foreground run in the candidate image that is shorter than indicated by the scale factor by up to a specified number of slack pixels; and
   allowing at least one background run in the candidate image to be correspondingly longer than indicated by the scale factor.

6. The method of claim 1 wherein treating background pixels as wildcards further comprises:
   responsive to detecting a run of background pixels:

computing a range of lengths corresponding to the scale factor;

skipping a number of pixels in the candidate image corresponding to a lower bound of the range;

considering the background run tentatively matched;

attempting to match a remainder of the row recursively; and performing a step from a group of steps consisting of:
- responsive to recursively matching the remainder of the row, considering the row to be a match; and
- responsive to not recursively matching the remainder of the row, skipping additional pixels corresponding to a next length in the range, and attempting to match a remainder of the row recursively, until recursively matching the remainder of the row or reaching an upper bound of the range.

7. The method of claim 1 wherein utilizing fuzzy color matching in which color levels of adjacent pixels in the foreground are allowed a specified variation further comprises:

including adjacent foreground pixels with color components within the specified variation in a single run.

8. The method of claim 7 further comprising:

counting a run of foreground pixels in the candidate image with a component that varies from the color component of a corresponding run in the target image as a match.

9. The method of claim 1 wherein determining whether the target image is present in the candidate image further comprises:

populating elements of a feature vector in which each element pertains to a row in the target image such that each element is set to a value which indicates whether the corresponding row in the candidate image is a match;

supplying the populated feature vector as input to a machine learning application that has been trained to detect image matches based on a suitable data set of matching and non-matching feature vectors; and basing the determination at least on output of the machine learning application.

10. The method of claim 1 wherein determining whether the target image is present in the candidate image further comprises step from a group of steps consisting of:

responsive to each row of the target image being matched by a corresponding row in a corresponding position of the candidate image, determining that the target image is present in the candidate image;

responsive to each row of the target image not being matched by a corresponding row in a corresponding position of the candidate image, determining that the target image is not present in the candidate image;

responsive to each row of the target image being matched by a corresponding row in any position of the candidate image, determining that the target image is present in the candidate image;

responsive to each row of the target image not being matched by a corresponding row in any position of the candidate image, determining that the target image is not present in the candidate image;

responsive to a requisite percentage of rows of the target image being matched by corresponding rows in corresponding positions of the candidate image, determining that the target image is present in the candidate image;

responsive to a requisite percentage of rows of the target image not being matched by corresponding rows in corresponding positions of the candidate image, determining that the target image is not present in the candidate image;

responsive to a requisite percentage of rows of the target image being matched by corresponding rows in any position of the candidate image, determining that the target image is present in the candidate image; and responsive to a requisite percentage of rows of the target image not being matched by corresponding rows in any position of the candidate image, determining that the target image is not present in the candidate image.

11. The method of claim 1 wherein determining whether the target image is present in the candidate image further comprises:

responsive to at least one row of the target image being matched by a corresponding row in the candidate image, supplying at least a corresponding region of target and candidate images as input to a traditional image matching application;

basing the determination at least on output of the traditional image matching application.

12. The method of claim 1 further comprising:

counting a match of only a requisite percentage of a row in the target image to a corresponding row in the candidate image as a match of that row.

13. The method of claim 1 further comprising:

counting a match of a row in the target image to a match of corresponding content beginning at any point in a corresponding row in the candidate image as a match of that row.

14. The method of claim 1 further comprising:

extracting the run length encoding data from the target image.

15. The method of claim 14 further comprising:

inserting zero length background runs between adjacent foreground runs in the target image run length encoding data.

16. The method of claim 1 wherein:

the target image comprises a logo associated with a business organization likely to be utilized fraudulently in attempts to deceive electronic consumers.

17. A computer readable storage medium storing an executable computer program product for using run length encoding to detect a target image in a candidate image, the computer program product comprising:

program code for extracting run length encoding data from the candidate image;

program code for distinguishing between a foreground and background of the candidate image and target image;

program code for matching color runs in the foreground and length runs in the background, the matching comprising:
- setting an initial scale interval according to a ratio of pixels in the target image matched to the candidate image for a first foreground match in a row; and
- narrowing the scale interval as more of the target image foreground is matched to the candidate image foreground in that row;

program code for treating background pixels as wildcards;

program code for utilizing fuzzy color matching in which color levels of adjacent pixels in the foreground are allowed a specified variation;

program code for comparing rows of the run length encoding data from the candidate image to rows of run length encoding data from the target image; and program code for determining whether the target is present in the candidate image based on at least results of the comparing step.

18. A computer system for using run length encoding to detect a target image in a candidate image, the computer system comprising:
  a computer-readable storage medium storing an executable computer program product comprising:
    a software portion for extracting run length encoding data from the candidate image;
    a software portion for distinguishing between a foreground and background of the candidate image and target image;
    a software portion for matching color runs in the foreground and length runs in the background, the matching comprising:
      setting an initial scale interval according to a ratio of pixels in the target image matched to the candidate image for a first foreground match in a row; and
      narrowing the scale interval as more of the target image foreground is matched to the candidate image foreground in that row;
    a software portion for treating background pixels as wildcards;
    a software portion for utilizing fuzzy color matching in which color levels of adjacent pixels in the foreground are allowed a specified variation;
    a software portion for comparing rows of the run length encoding data from the candidate image to rows of run length encoding data from the target image; and
    a software portion for determining whether the target image is present in the candidate image based on at least results of the comparing step.

19. A computer system for using run length encoding to detect a target image in a candidate image, the computer system comprising:
  a computer-readable storage medium storing an executable computer program product comprising:
    means for extracting run length encoding data from the candidate image;
    means for distinguishing between a foreground and background of the candidate image and target image;
    means for matching color runs in the foreground and length runs in the background, the matching comprising:
      setting an initial scale interval according to a ratio of pixels in the target image to matched the candidate image for a first foreground match in a row; and
      narrowing the scale interval as more of the target image foreground is matched to the candidate image foreground in that row;
    means for treating background pixels as wildcards;
    means for utilizing fuzzy color matching in which color levels of adjacent pixels in the foreground are allowed a specified variation;
    means for comparing rows of the run length encoding data from the candidate image to rows of run length encoding data from the target image; and
    means for determining whether the target image is present in the candidate image based on at least results of the comparing step.

* * * * *